(12) United States Patent
Jirskog

(10) Patent No.: US 7,924,217 B2
(45) Date of Patent: Apr. 12, 2011

(54) HIGH SENSITIVITY FREQUENCY MODULATED RADAR LEVEL GAUGE SYSTEM

(75) Inventor: Anders Jirskog, Huskvarna (SE)

(73) Assignee: Rosemount Tank Radar AB, Gothenburg (SE)

( * ) Notice: Subject to any disclaimer, the term of this patent is extended or adjusted under 35 U.S.C. 154(b) by 212 days.

(21) Appl. No.: 12/132,114

(22) Filed: Jun. 3, 2008

(65) Prior Publication Data
US 2009/0315758 A1 Dec. 24, 2009

(51) Int. Cl.
*G01S 13/08* (2006.01)
*G01S 13/32* (2006.01)
*G01F 23/00* (2006.01)
*G01S 13/00* (2006.01)

(52) U.S. Cl. ........ 342/124; 342/118; 342/127; 342/128; 342/175; 342/195

(58) Field of Classification Search ............ 342/82–103, 342/118, 123, 124, 127, 175, 192–197, 128–133; 73/290 R, 304 R, 304 C, 290 B, 290 V; 324/600, 324/629, 637, 642–646
See application file for complete search history.

(56) References Cited

U.S. PATENT DOCUMENTS

| | | | |
|---|---|---|---|
| 5,543,720 A | 8/1996 | Edvardsson | |
| 5,659,321 A | 8/1997 | Burger et al. | 342/124 |
| 5,896,104 A | 4/1999 | Komatsu et al. | 342/175 |
| 6,107,957 A * | 8/2000 | Cramer et al. | 342/124 |
| 6,300,897 B1 * | 10/2001 | Kielb | 342/124 |
| 6,606,904 B2 * | 8/2003 | Muller et al. | 73/290 V |
| 7,053,630 B2 * | 5/2006 | Westerling et al. | 324/644 |
| 7,106,247 B2 | 9/2006 | Edvardsson | 342/124 |
| RE40,128 E * | 3/2008 | Kielb | 342/124 |
| 7,589,664 B2 * | 9/2009 | Jirskog | 342/124 |
| 7,605,748 B2 * | 10/2009 | Fehrenbach et al. | 342/124 |

FOREIGN PATENT DOCUMENTS

EP 0 531 877 A1 3/1993

OTHER PUBLICATIONS

International Search Report from correspondence application No. PCT/SE2009/050648, dated Aug. 24, 2009.

* cited by examiner

*Primary Examiner* — Bernarr E Gregory
(74) *Attorney, Agent, or Firm* — Westman, Champlin & Kelly, P.A.

(57) ABSTRACT

A radar level gauge system for determining a filling level of a product contained in a tank, comprising: a transceiver for generating, transmitting and receiving frequency-modulated electromagnetic signals; a transmitting propagating device electrically connected to the transceiver and arranged to propagate transmitted electromagnetic signals towards a surface of the product contained in the tank; and a receiving propagating device electrically connected to the transceiver and arranged to return echo signals resulting from reflections at impedance transitions encountered by the transmitted electromagnetic signals, including a surface echo signal resulting from reflection at the surface, back to the transceiver.

13 Claims, 3 Drawing Sheets

HIGH SENSITIVITY FREQUENCY MODULATED RADAR LEVEL GAUGE SYSTEM

TECHNICAL FIELD OF THE INVENTION

The present invention relates to a frequency modulated radar level gauge system.

TECHNICAL BACKGROUND

Radar level gauge systems are today in use in a variety of fields of application for accurate filling level determination. For determining the filling level of a product by means of a radar level gauge system, electromagnetic signals are transmitted and propagated, usually by means of an antenna, towards a surface of the product, where signals are reflected. The reflected signals are received by the radar level gauge system, and the distance between a reference position and the surface of the product is determined by comparing the transmitted signals with the reflected signals. Based on this distance, the filling level can be determined.

Most radar level gauge systems on the market today are either systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type. There are also radar level gauge systems that are a mix between the two types mentioned above.

Different radar level gauge systems can determine the filling level of a product contained in a tank with different sensitivity levels. Generally, in a radar level gauge system having a high sensitivity, the filling level of the product in the tank can be determined even if a very weak electromagnetic signal is transmitted. The weakest transmitted signal enabling filling level determination may be used as a measure of the sensitivity of the radar level gauge system.

Depending on the field of application of the radar level gauge system and factors such as the electrical properties of the product contained in the tank, there are different requirements on the sensitivity of the radar level gauge system. For example, a high sensitivity is generally required to ensure a reliable filling level determination when the product inside the tank has similar signal propagation characteristics as the atmosphere in the tank. This results in a small impedance transition at the surface and, accordingly, a relatively weak echo signal. Examples of products yielding relatively weak echo signals are liquid natural gas (LNG), liquid petroleum gas (LPG), oil-based products, solids such as plastic pellets or grain etc.

Furthermore, a high sensitivity is generally required in open or semi-open applications, such as open tanks, floating-roof tanks, reservoirs, rivers, or lakes, when the operation of the radar level gauge system is typically subject to government regulations in respect of such parameters as the frequency and power of the transmitted signals.

In view of demanding applications such as those exemplified above, currently available radar level gauge systems often exhibit an insufficient level of sensitivity.

SUMMARY OF THE INVENTION

In view of the above-mentioned and other drawbacks of the prior art, a general object of the present invention is to provide an improved frequency modulated radar level gauge system, and in particular a frequency modulated radar level gauge system having an increased sensitivity.

According to a first aspect of the present invention, these and other objects are achieved through a radar level gauge system, for determining a filling level of a product contained in a tank, the radar level gauge system comprising: a transceiver for generating, transmitting and receiving frequency-modulated electromagnetic signals; a transmitting propagating device electrically connected to the transceiver and arranged to propagate transmitted electromagnetic signals towards a surface of the product contained in the tank; and a receiving propagating device electrically connected to the transceiver and arranged to return echo signals resulting from reflections at impedance transitions encountered by the transmitted electromagnetic signals, including a surface echo signal resulting from reflection at the surface, back to the transceiver; wherein the transceiver comprises: a signal generator for generating a frequency-modulated signal having a predetermined center frequency; a transmitter branch connecting an output of the signal generator with the transmitting propagating device via a first frequency converter for converting the frequency of the frequency-modulated signal to provide the transmitted electromagnetic signal; a receiver branch connected to the receiving propagating device for receiving the surface echo signal; and a mixer having a first input connected to the signal generator via a second frequency converter for converting the frequency of the frequency-modulated signal and a second input connected to the receiver branch, for forming an intermediate frequency signal indicative of a phase difference between the transmitted electromagnetic signal and the surface echo signal, and wherein a signal isolation between the transmitting propagating device and the receiving propagating device is at least 30 dB for the transmitted electromagnetic signals and the echo signals, the radar level gauge system further comprising processing circuitry connected to the transceiver for determining the filling level based on the intermediate frequency signal.

Each of the transmitting propagating device and the receiving propagating device may be any device capable of directing electromagnetic signals from and towards the transceiver, respectively.

The transmitting propagating device may be configured to radiate electromagnetic signals into free space, or to guide electromagnetic signals along a wave guiding structure, and the receiving propagating device may be configured to capture electromagnetic signals propagating in free space, or to guide electromagnetic signals along a wave guiding structure.

Examples of transmitting and receiving propagating devices include horn antennas, rod antennas, patch antennas, array antennas and various kinds of probes, such as single line probes, twin line probes, coaxial probes etc. In some applications, such as in so-called floating roof tanks, the propagating device(s), typically an antenna, is often referred to as mode converter or mode generator.

The tank may be any container or vessel capable of containing a product, and may be metallic, or partly or completely non-metallic, open, semi-open, or closed.

In the context of the present application, a "frequency converter" should be understood as a device capable of converting the frequency of an input electromagnetic signal, such that an electromagnetic signal output by the frequency converter has a frequency which differs from the frequency of the input electromagnetic signal. Such devices are well known to the person skilled in the art, and may, for example, be implemented using frequency multipliers or mixers.

In the case of the frequency converter being a frequency multiplier, this should be understood as a device capable of multiplying the frequency of an input electromagnetic signal by a predetermined multiplication factor, such that the electromagnetic signal output by the multiplier has a frequency which is the frequency of the input electromagnetic signal times the multiplication factor.

The present invention is based upon the realization that an improved sensitivity can be achieved by improving the signal isolation in the radar level gauge system. In particular, the present inventor has realized that the signal isolation should be improved, that is, the leakage between the transmitter branch and the receiver branch should be reduced, for electromagnetic signals within the frequency range of the received echo signals (and thus the transmitted electromagnetic signals).

By providing, in the transceiver, first and second frequency converters in accordance with the present invention, the number of leakage paths for electromagnetic signals within the frequency range of the transmitted and received electromagnetic signals can be reduced significantly, because, apart from along the receiver branch, such signals only exist between the first frequency converter and the transmitting propagating device and between the second frequency converter and the mixer. Through suitable positioning of the first and second frequency converters, that is, as close as possible to the transmitting propagating device and the mixer, respectively, the number of relevant leakage paths can be reduced considerably. Accordingly, the signal isolation between the transmitter and receiver branches can be significantly reduced and, hence, the sensitivity of the radar level gauge system increased.

To even further increase the sensitivity of the radar level gauge system according to the present invention, a signal isolation between the transmitting propagating device and the receiving propagating device may be at least 30 dB. With an even further increased signal isolation between the transmitting propagating device and the receiving propagating device of, say, 50 dB, a frequency-modulated radar level gauge system can be achieved in which the measurement sensitivity is not limited by the signal isolation, but rather by noise. When such a level has been reached, further measures can be taken to increase the signal-to-noise ratio. Such measures may, for example, include amplifying the received echo signals using a low noise amplifier, increasing the power of the transmitted electromagnetic signals etc.

The transmitting propagating device and the receiving propagating device may advantageously be provided as a dual-function structure comprising a transmitter part and a receiver part.

Moreover, the transmitting and receiving propagating devices may be provided as spaced apart, separate propagating devices or be comprised in a single propagation device. In some applications, the transmitting propagating device and the receiving propagating device may be provided as a single propagating device and the transmitted and received signals may be provided as mutually distinguishable signals, for example by providing the transmitted signal as a circularly polarized signal. Radar level gauge systems using such a single antenna with mutually distinguishable transmitted and received signals are further described in U.S. Pat. No. 5,543,720 and U.S. Pat. No. 7,106,247, which are hereby incorporated by reference.

In the above-mentioned dual-function structure, the transmitter and receiver parts may, for example, be provided in the form of a horn antenna having a partition defining a transmitter part and a receiver part.

Alternatively, the dual-function structure may be a patch antenna in which the transmitter part comprises a plurality of transmitter patches which may be arranged on a transmitter supporting element, and the receiver part comprises a plurality of receiver patches which may be arranged on a receiver supporting element.

By providing the dual-function structure as a patch antenna, a compact and low-cost antenna solution can be achieved.

According to one embodiment, the transmitter supporting element and the receiver supporting element may be provided as separate elements, whereby a very high signal isolation between the transmitter part and the receiver part can be achieved.

According to another embodiment, the transmitter supporting element and the receiver supporting element may both included in a single supporting element. In this case, the circuitry of the antenna should be laid out in such a way that a high signal isolation, such as at least 30 dB, between the transmitter patches and the receiver patches is achieved.

This may, for example, be achieved by arranging the transmitter patches and the receiver patches on the supporting structure in such a way that no current flows between transmitter patches and receiver patches when the radar level gauge system operates. In other words, the transmitter patches and the receiver patches may be galvanically separated from each other, whereby a very high signal isolation, typically in excess of 30 dB, can be achieved between the transmitter part and the receiver part of the dual-function structure.

Advantageously, furthermore, the supporting element may support further circuitry, such as transceiver circuitry, and possibly also processing circuitry for processing the signals output by the transceiver circuitry.

Any one of the various supporting structures may advantageously be provided in the form of a circuit board especially suited for microwave applications, such as a PTFE circuit board. Alternatively, the supporting element may be provided in the form of a more conventional circuit board, such as an FR-4 board.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the present description, embodiments of the present invention are mainly described with reference to a radar level gauge system of the frequency modulated continuous wave (FMCW) type having a single patch antenna for radiating and capturing electromagnetic signals. It should be noted that this by no means limits the scope of the invention, which is equally applicable to other frequency-modulated radar level gauge systems, such as RLG-systems in which pulses modulated on a carrier are used for filling level determination.

Moreover, the radar level gauge system according to the present invention may be equipped with any other type of propagating device(s), such as a horn antenna, a rod antenna, an array antenna, or a probe, such as a single-line probe (including a so-called Goubau probe), a twin-line probe or a coaxial probe.

Figure 1:
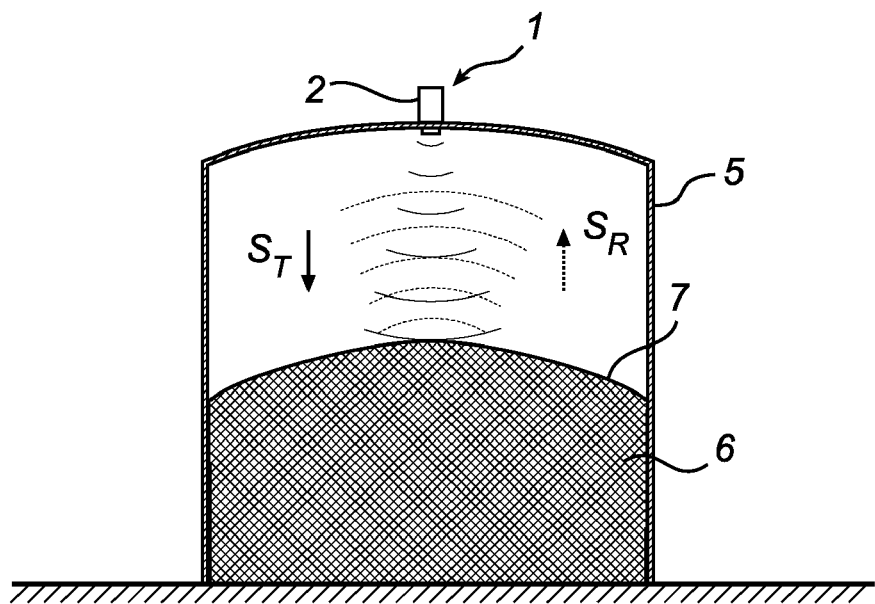
FIG. 1 schematically illustrates a radar level gauge system according to an embodiment of the present invention installed in an exemplary tank containing a solid.

FIG. 1 schematically illustrates a radar level gauge system 1 according to an embodiment of the present invention, comprising a measurement electronics unit 2, and an antenna device 3. The radar level gauge system 1 is provided on a tank 5, which is partly filled with a product 6 to be gauged. In the case illustrated in FIG. 1, the product 6 is a solid, such as grain or plastic pellets, which is well-known to represent a difficult application requiring a relatively high measurement sensitivity of the radar level gauge system. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level can be deduced. It should be noted that, although a tank 5 containing a single product 6 is discussed herein, the distance to any material interface present in the tank 5 can be measured in a similar manner.

Figure 2:
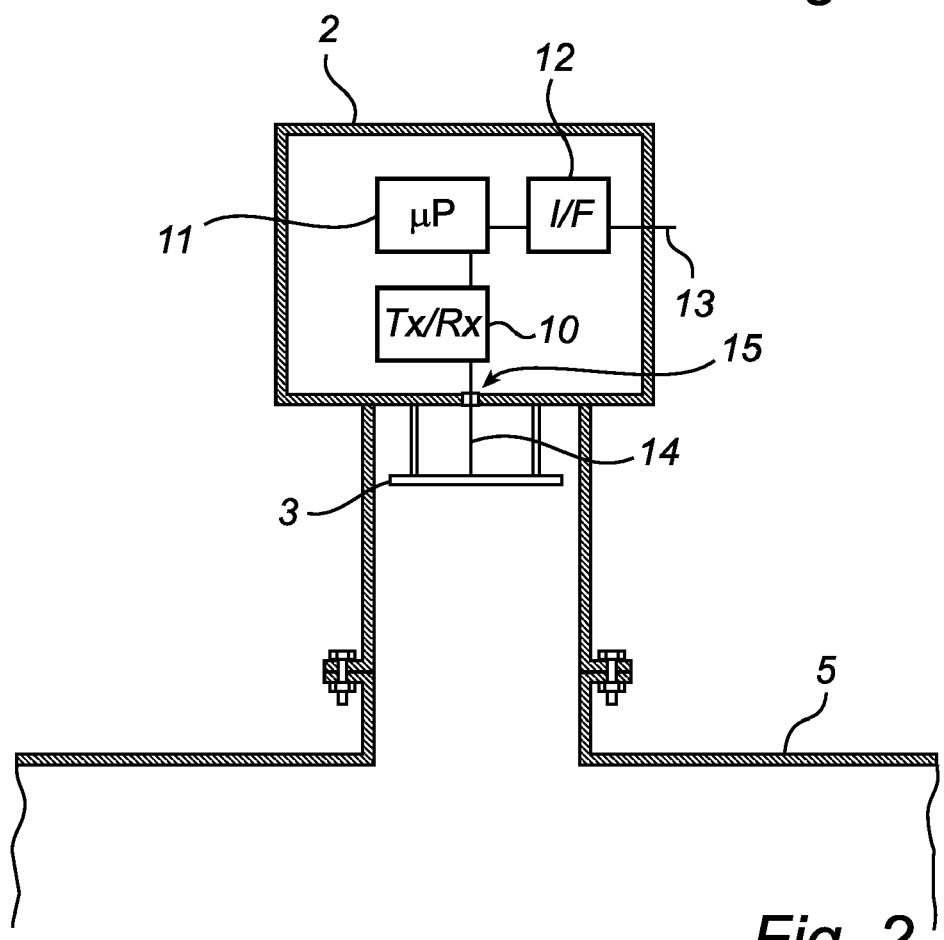
FIG. 2 is a schematic illustration of the measurement electronics unit comprised in the radar level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the patch antenna 3 via a conductor 14 passing through a feed-through 15 provided in the tank wall. It should be understood that this is not necessarily the case, and that at least the transceiver 10 may be provided in the interior of the tank 5. For example, at least the transceiver 10 and the patch antenna 3 may be provided on the same circuit board.

Figure 3:
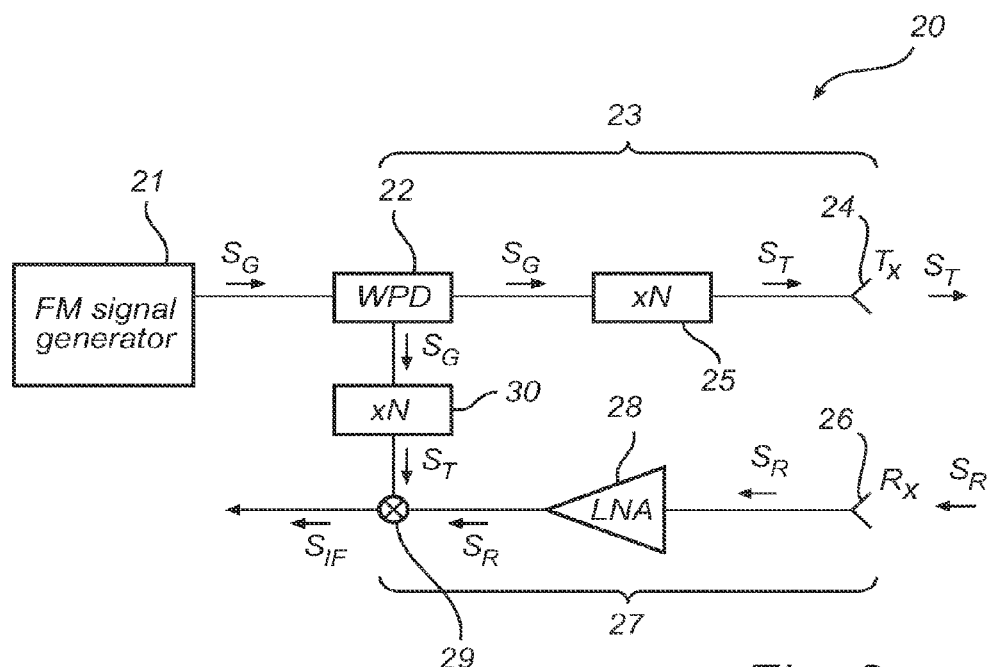
FIG. 3 schematically illustrates a transceiver comprised in an embodiment of the radar level gauge system according to the present invention.

FIG. 3 schematically shows an exemplary transceiver 20 comprised in a radar level gauge according to an embodiment of the present invention.

The transceiver 20 in FIG. 3 comprises an FM signal generator 21 connected to power dividing circuitry, here in the form of a Wilkinson Power Divider (WPD) 22. Furthermore, the transceiver 20 has a transmitter branch 23 connecting the FM signal generator 21 with a transmitting propagating device 24 via the WPD 22 and a first frequency multiplier 25, which is configured to multiply the frequency of the frequency-modulated electromagnetic signals $S_G$ generated by the FM signal generator 21 with a predetermined multiplication factor N, to thereby form signals $S_T$ to be transmitted through the transmitting propagating device 24.

The transmitted electromagnetic signals $S_T$ are reflected at impedance transitions in the tank 5, including the surface 7 of the product 6 contained in the tank 5, and are returned to the transceiver 20 as echo signals $S_R$ by the receiving propagating device 26.

After having been captured by the receiving propagating device 26, the echo signals $S_R$ follow the receiver branch 27 along which the signals $S_R$ are, in the exemplary embodiment illustrated in FIG. 3, amplified by a low noise amplifier 28 to improve the signal-to-noise ratio of the radar level gauge system.

The receiver branch 27 is connected to a mixer 29, where the received echo signals $S_R$ are mixed with signals from the FM signal generator 21 multiplied by the predetermined multiplication factor N in a second frequency multiplier 30, whereby an intermediate frequency signal $S_{IF}$ indicative of a frequency difference between the transmitted electromagnetic signal $S_T$ and the received echo signals $S_R$ is formed.

The distance to the surface 7 of the product 6 contained in the tank 5 can then be determined based on the intermediate frequency signal $S_{IF}$.

The determination of the distance to the surface 7 based on the intermediate frequency signal $S_{IF}$ is well-known to the person skilled in the art.

As is evident from FIG. 3, the provision according to the present invention of first and second frequency converters, here frequency multipliers 25, 30 results in that the presence of signals at the frequency of the transmitted electromagnetic signals $S_T$ (and the received echo signals $S_R$) can be kept to a minimum. This is especially the case if the first frequency multiplier 25 is provided close to the transmitting propagating device 24 and the second frequency multiplier 30 is provided close to the mixer 29.

It should be noted that the transmitted signals ST and the signals provided to the mixer 29 via the second frequency multiplier 30 originate from the same FM signal generator 21. Hereby, phase noise, or jitter, in the generated signal $S_G$ can be cancelled out when measuring small distances, which may further improve the measurement sensitivity, provided that a sufficiently high signal isolation between the transmitted signals $S_T$ and the received echo signals $S_R$ can be achieved. Therefore, the use of a single FM signal generator 21 for feeding signals to the transmitting propagating device 24 via the first frequency multiplier and for feeding signals to the mixer 29 via the second frequency multiplier 30 as illustrated in FIG. 3 is especially advantageous in combination with providing the transmitting propagating device 24 and the receiving propagating device 26 in such a way that there is a high signal isolation there between. Examples of suitable arrangements of the transmitting 24 and receiving 26 propagating devices will now be described.

Figure 4A:
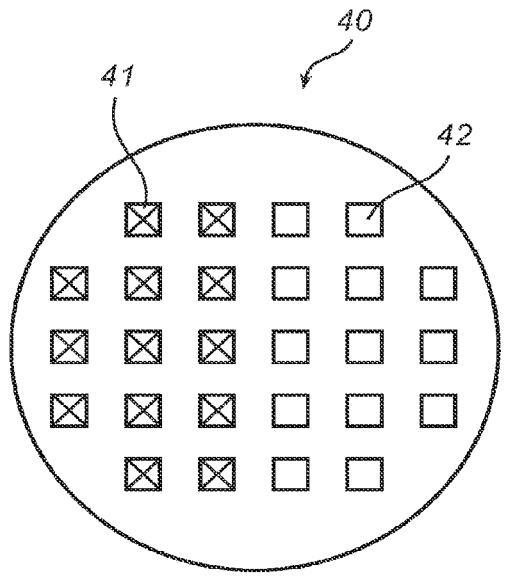
FIGS. 4a-b schematically illustrate exemplary patch antennas comprised in embodiments of the radar level gauge system according to the present invention.
Figure 4B:
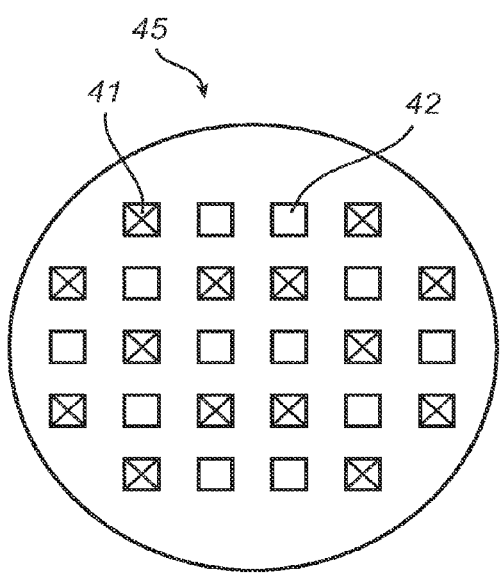

With reference to FIGS. 4a-b, exemplary patch antennas comprised in embodiments of the radar level gauge according to the present invention to further increase the measurement sensitivity will now be described.

FIG. 4a schematically illustrates a first exemplary patch antenna 40 comprising a set or transmitter patches 41 represented by crossed boxes and a set of receiver patches 42 represented by empty boxes (only one each of these patches are denoted with reference numerals in FIG. 4a for the sake of clarity of drawing). By providing the transmitter patches 41 and the receiver patches 42 in such a way that they are galvanically separated from each other, that is, that there is no current flowing between transmitter patches 41 and receiver patches 42 when the radar level gauge system is in operation, a compact, low-cost antenna device 40 with a very high signal isolation can be achieved, which may advantageously be used in combination with the transceiver 20 in FIG. 3 to achieve a frequency-modulated radar level gauge system having a very high measurement sensitivity.

FIG. 4b schematically illustrates a second exemplary patch antenna 45 comprising a set of transmitter patches 41 and a set of receiver patches 42. The difference between the antenna device 45 in FIG. 4b and the antenna device 40 in FIG. 4a is that the transmitter patches 41 and the receiver patches 42 are interleaved in the antenna device 45 in FIG. 4b.

It should be understood that numerous other patch antenna configurations are feasible and can be realized by the person skilled in the relevant art without the need to exercise any inventive skill.

Finally, with reference to FIG. 5, a further exemplary antenna device, in the form of a horn antenna 50 suitable for use together with the transceiver 20 in FIG. 3 will now be described.

Figure 5:
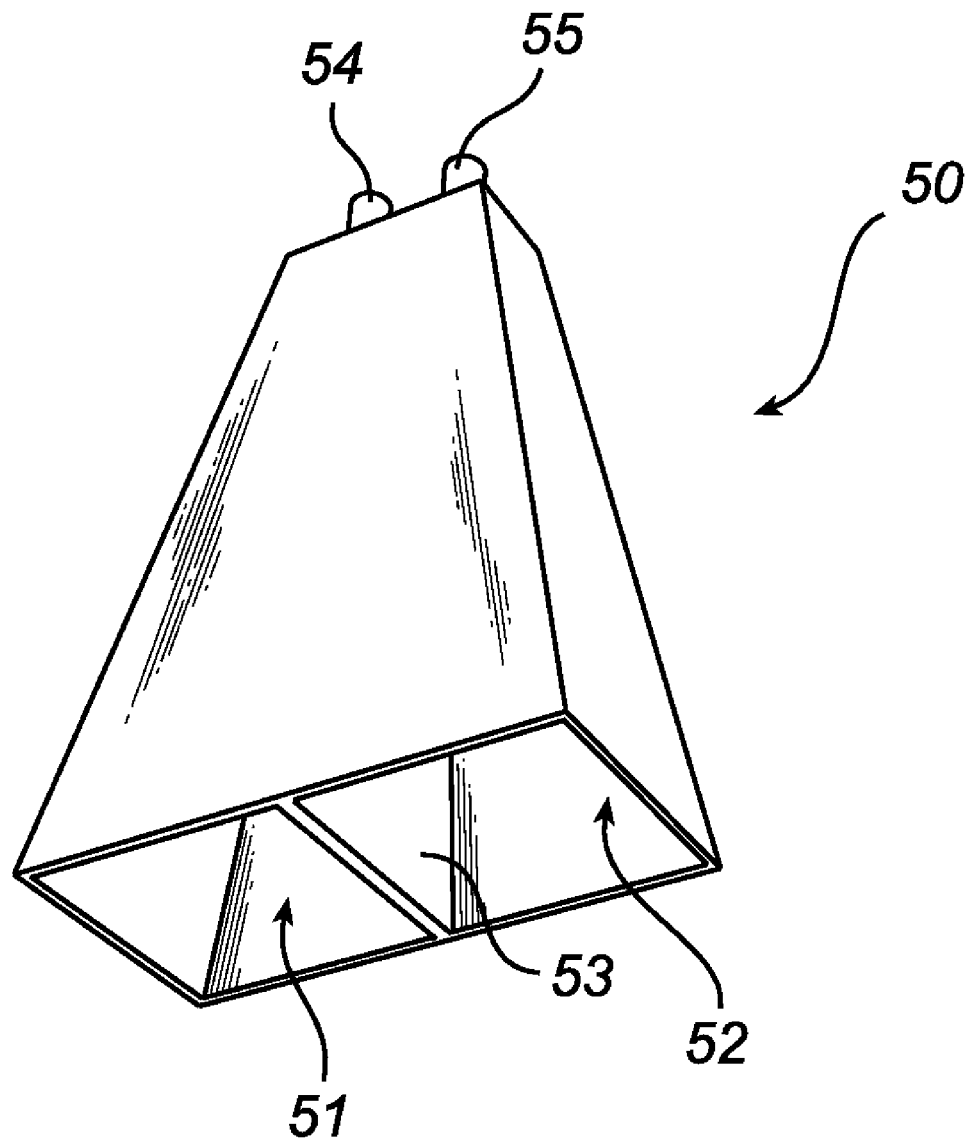
FIG. 5 schematically illustrates an exemplary horn antenna comprised in an embodiment of the radar level gauge system according to the present invention.

FIG. 5 schematically illustrates a horn antenna 50 comprising a transmitter part 51 and a receiver part 52. The transmitter part 51 and the receiver part 52 are separated by a partition 53 dividing the interior of the horn antenna in two.

Furthermore, the antenna device 50 in FIG. 5 has a transmitter connector 54 and a receiver connector 55 for enabling connecting the antenna device 50 to a transceiver 20.

The person skilled in the art realizes that the present invention by no means is limited to the preferred embodiments described above. For example, other types of frequency converters than frequency multipliers can be used. Furthermore, many other kinds of antenna arrangements may advantageously be used in the radar level gauge system according to the present invention, such as parabolic antennas, probes etc.

What is claimed is:

1. A radar level gauge system, for determining a filling level of a product contained in a tank, said radar level gauge system comprising:
    a transceiver for generating, transmitting and receiving frequency-modulated electromagnetic signals;
    a transmitting propagating device electrically connected to said transceiver and arranged to propagate transmitted electromagnetic signals towards a surface of the product contained in the tank; and
    a receiving propagating device electrically connected to said transceiver and arranged to return echo signals resulting from reflections at impedance transitions encountered by the transmitted electromagnetic signals, including a surface echo signal resulting from reflection at said surface, back to said transceiver,
    wherein said transceiver comprises:
        a signal generator for generating a frequency-modulated signal having a predetermined center frequency;
        a transmitter branch connecting an output of said signal generator with said transmitting propagating device via a first frequency converter for converting the frequency of said frequency-modulated signal to provide said transmitted electromagnetic signal;
        a receiver branch connected to said receiving propagating device for receiving said surface echo signal; and
        a mixer having a first input connected to said signal generator via a second frequency converter for converting the frequency of said frequency-modulated signal and a second input connected to said receiver branch, for forming an intermediate frequency signal indicative of a phase difference between said transmitted electromagnetic signal and said surface echo signal, and
    wherein a signal isolation between said transmitting propagating device and said receiving propagating device is at least 30 dB for said transmitted electromagnetic signals and said echo signals,
    said radar level gauge system further comprising processing circuitry connected to said transceiver for determining said filling level based on said intermediate frequency signal.

2. The radar level gauge system according to claim 1, wherein said transmitting propagating device and said receiving propagating device are provided as a dual-function structure comprising a transmitter part and a receiver part.

3. The radar level gauge system according to claim 2, wherein said dual-function structure is a patch antenna device, said transmitter part comprises a plurality of transmitter patches, and said receiver part comprises a plurality of receiver patches.

4. The radar level gauge system according to claim 3, wherein said transmitter patches and said receiver patches are provided on a single supporting element.

5. The radar level gauge system according to claim 4, wherein said transmitter patches and said receiver patches are arranged on said supporting element in such a way that no current flows between transmitter patches and receiver patches when said radar level gauge system operates.

6. The radar level gauge system according to claim 4, wherein said transceiver is additionally provided on said supporting element.

7. The radar level gauge system according to claim 2, wherein said dual function structure is a horn antenna partitioned into a transmitter horn and a receiver horn.

8. The radar level gauge system according to claim 1, wherein said transmitting propagating device is spaced apart from said receiving propagating device.

9. The radar level gauge system according to claim 8, wherein each of said transmitting propagating device and said receiving propagating device is any one of a horn antenna, a parabolic antenna, a patch antenna and a rod antenna.

10. The radar level gauge system according to claim 1, wherein said first frequency converter is a first frequency multiplier having a first predetermined multiplication factor, and said second frequency converter is a second frequency multiplier having a second predetermined multiplication factor.

11. The radar level gauge system according to claim 10, wherein said second multiplication factor is substantially equal to said first multiplication factor.

12. The radar level gauge system according to claim 1, further comprising a low noise amplifier provided on the receiver branch to amplify said received echo signals.

13. The radar level gauge system according to claim 1, wherein said transmitting propagating structure is a transmitter antenna arranged to radiate a transmitted electromagnetic signal towards a surface of the product contained in the tank, and said receiving propagating device is a receiver antenna arranged to capture echo signals resulting from reflections at impedance transitions encountered by said transmitted electromagnetic signal.

* * * * *